(No Model.)

A. B. ROBBINS.
HORSE POWER LAWN MOWER.

No. 480,831. Patented Aug. 16, 1892.

Witnesses.
O. E. Van Doren.
C. G. Hawley.

Inventor
Andrew B. Robbins.
By Paul & Merwin Atty s.

THE NORRIS PETERS CO., PHOTO-LITHO., WASHINGTON, D. C.

UNITED STATES PATENT OFFICE.

ANDREW B. ROBBINS, OF MINNEAPOLIS, MINNESOTA, ASSIGNOR OF ONE-HALF TO EDWARD W. LOOSE, OF SAME PLACE.

HORSE-POWER LAWN-MOWER.

SPECIFICATION forming part of Letters Patent No. 480,831, dated August 16, 1892.

Application filed October 15, 1891. Serial No. 408,798. (No model.)

*To all whom it may concern:*

Be it known that I, ANDREW B. ROBBINS, of Minneapolis, in the county of Hennepin and State of Minnesota, have invented certain Improvements in Horse-Power Lawn-Mowers, of which the following is a specification.

My invention relates to lawn-mowers adapted to perform a large amount of work to a given power; and the object of the invention is to provide a mowing-machine which will do double or treble the work of an ordinary hand-mower with about the same force exerted to draw the machine; to provide a mower which will accommodate itself to uneven ground, and to provide a mower of very light weight which can be drawn by a small horse, thus saving the lawn, which will be very simple and cheap in construction, and which may be readily guided by the driver.

To this end my invention consists generally in the construction and combination hereinafter described, and particularly pointed out in the claims.

My invention will be more readily understood by reference to the accompanying drawings, in which—

Figure 4:
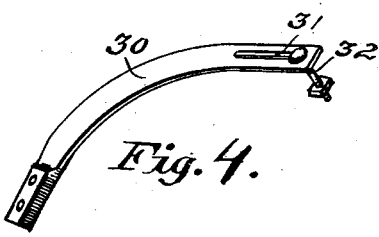
Figure 1:
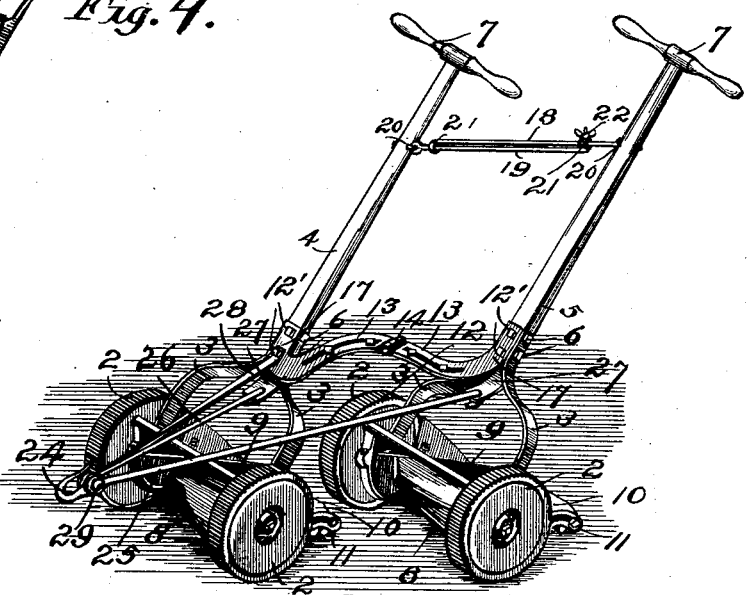
Figure 2:
Figure 3:
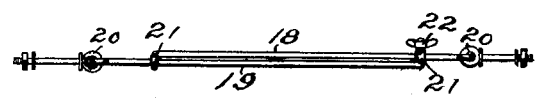

Figure 1 is a perspective view of a machine embodying my invention. Fig. 2 is a perspective view of my very simple attachment for securing two ordinary hand-mowers together. Fig. 3 is a detail showing means for fastening the handles of the two mowers together. Fig. 4 shows a cheap substitute for one of the mower-handles.

As shown in the drawings, two hand-mowers are fastened together side by side, so as to make a clean cut the full width of the two wipers of the machines. From the frame upon which the driving-wheels 2 are fastened the yokes 3 extend up to engage the sides of the mower-handles 4 5, to which they are secured by bolts 6. Each handle is provided with a cross-bar 7 of the usual form. The knives 8 of the machines and the wipers 9 may be of any desired type, and the rear end of each mower is supported by the usual small roller 10, adjustably fastened in the rearwardly-extending arms 11. The rear mower runs with the inside of its right-hand wheel 2 on a line or overlapping with that of the left-hand wheel of the front mower, so that the ends of the wipers and knives of the two mowers overlap slightly, thereby insuring a clean smooth cut of a width equal to that of the whole mower. The sections are held in position by the ogee-curved brace and strap extending between the points 12' on the handles. This strap is divided into the two curved parts 13, held in relation to one another by the hinge 14, the ends of which are provided with the bolts 15, extending through the slots 16 and adapted to be locked therein. Each part 13 is provided with the upturned end 17, which ends are bolted to the handles. It will be seen that one of these ends is considerably in advance of the other, so that one mower is held firmly in such a position. The hinge 14 allows an independent movement for each hand-mower or section, so that the wide mower constituted thereby accommodates itself to the most uneven ground. The upper ends of the handles are held in position by the rods 18 and 19, secured to the handles by the eyes 20. Each rod is provided with a loop 21 to embrace the other, and one of these loops is provided with the set-screw or thumb-nut 22, by which it may be clamped or locked upon its rod, thereby tying the handles firmly together, while allowing them free movement.

This mower is adapted to be drawn by a single horse, and the whiffletree-clip is secured in the hook 24, fastened on the forward ends of the two draft bars or rods 25 and 26. The rear ends of the bars are hooked into the straps 27, extending between the legs of the yokes 3, and fastened to the backs of the handles by the same bolts which secure the ends of the adjustable hinge-connecting strap. In this way the draft is exerted at the middle point of each mower, and, owing to the counterbalancing effect of the upper parts of the handles at intermediate points, the mower is always kept level upon the ground and tilting avoided. I support the hook 24 and the ends of the draft-rods by the tie-rod 28, extending from the handle of the front mower to the bolt 29, connecting the hook and said rods.

The handles of the hand-mowers are quite expensive, and I may reduce the expense of manufacture by substituting in place of the forward handle of the mover a bar or rod 30, having its lower end secured between the ends of the yoke of the front mower and the top and bottom straps 17 and 27. The upper and rear end of this bar is curved, so as to be practically at right angles with the handle, and is provided with the slot 31. The bolt 32 is arranged therein and secured in the handle, the head of the same preventing the pulling out of the end of the bar. By this construction it will be seen that twisting of the parts is prevented, while at the same time sufficient lateral play is allowed to keep both the sections always on the ground.

Instead of using two of the small hand-mowers, I may obviously, by duplicating the connections, employ three or more, the same being arranged so that the edges of their wipers overlap with respect to the cut.

Having thus described my invention, I claim as new and desire to secure by Letters Patent—

1. The combination, in a horse-power lawn-mower, of two or more hand lawn-mowers, with flexible connecting-bars or straps for the same, the yokes of said mower and draft-rods extending forward from the centers thereof, substantially as described.

2. The combination, in a horse-power lawn-mower, of two or more hand-mowers provided with yokes and handles, a hinged strap between each two mowers and secured at the bases of said handles, and draft-rods having their forward ends fastened at substantially the same points, as set forth.

3. The combination, in a horse-power lawn-mower, of two or more hand lawn-mowers having the usual yokes, with curved and hinged connecting and brace straps therefor, draft connections, and means whereby said mowers are held against independent forward movement, but allowed a degree of vertical play, substantially as described.

4. The combination, in a horse-power lawn-mower, of two or more hand lawn-mowers provided with handles, with a curved adjustable hinged strap extending between each two mowers to hold the same laterally and longitudinally separate, and an adjustable link or links arranged between the upper portions of each pair of said handles, substantially as described.

5. The combination, in a horse-power lawn-mower, of two or more hand lawn-mowers, with the curved straps secured upon the handles thereof and extending between the same, a hinge adjustably connecting said parts, lugs or straps 27, draft-rods hooked therein, means for attaching the forward ends of the same to the whiffletree, and a tie or truss bar 28, extending between the handle of the forward machine and said forward ends, substantially as described.

6. The combination, in a horse-power lawn-mower, of two or more small mowers with handles therefor, the backwardly and laterally curved connecting strap or bar, a hinge adjustably arranged therein, the adjustable tie-link between the upper parts of the handles and composed of the rods 18 and 19, provided with a locking device, the straps 27, the draft-rods 26, the hook 24, secured thereto, and a supporting-bar 28, fastened to the forward mower, said mowers being arranged to lap with respect to the cut, substantially as described.

In testimony whereof I have hereunto set my hand this 9th day of October, 1891.

ANDREW B. ROBBINS.

In presence of—
C. G. HAWLEY,
F. S. LYON.